United States Patent
Shaffer et al.

(10) Patent No.: US 9,319,852 B2
(45) Date of Patent: Apr. 19, 2016

(54) INTEROPERABILITY AND COMMUNICATIONS SYSTEM DYNAMIC MEDIA PROXY BASED ON CAPABILITY NEGOTIATION

(71) Applicant: Cisco Technology, Inc., San Jose, CA (US)

(72) Inventors: Shmuel Shaffer, Palo Alto, CA (US); Amit Barave, Sunnyvale, CA (US); Steven Christenson, Campbell, CA (US); Marcelo Oliveira, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/523,299

(22) Filed: Oct. 24, 2014

(65) Prior Publication Data
US 2015/0045082 A1 Feb. 12, 2015

Related U.S. Application Data

(62) Division of application No. 12/127,397, filed on May 27, 2008, now Pat. No. 8,892,149.

(51) Int. Cl.
*H04B 7/00* (2006.01)
*H04W 4/08* (2009.01)
*H04L 29/06* (2006.01)

(52) U.S. Cl.
CPC .............. *H04W 4/08* (2013.01); *H04L 65/105* (2013.01); *H04L 65/605* (2013.01); *H04L 69/24* (2013.01)

(58) Field of Classification Search
USPC ......................................................... 455/519
See application file for complete search history.

(56) References Cited

U.S. PATENT DOCUMENTS

| 2004/0224668 | A1 | 11/2004 | Shell et al. |
| 2007/0036100 | A1* | 2/2007 | Shaffer ................. H04W 4/021 370/328 |

(Continued)

OTHER PUBLICATIONS

Cisco Systems. Cisco Brings IP Networking to World of Two-Way Radios. http://newsroom.cisco.com/dlls/2005/ts_102405.html. Last accessed Jun. 3, 2008.

(Continued)

*Primary Examiner* — Ankur Jain
(74) *Attorney, Agent, or Firm* — Edell, Shaprio & Finnan, LLC

(57) ABSTRACT

A system and methodology to facilitate communication between non-compatible communication devices by utilization of a dynamic media proxy is provided. Information associated with an endpoint, such as, media capabilities, identity and system resource information is collected. Media proxy'ing is performed as part of capability negotiation. A dynamic media proxy is employed based on an analysis of the collected information. An analysis component can identify an endpoint that does not adhere to specific rules of transmission and can dynamically connect such an endpoint to a VTG (virtual talk group) via a proxy to prevent the endpoint from transmitting media into an active VTG that already has multiple talkers streaming media. Additionally, the location where media processing can occur can be dynamically determined based on the available system resources.

20 Claims, 11 Drawing Sheets

(56) References Cited

U.S. PATENT DOCUMENTS

2007/0105579 A1* 5/2007 Shaffer ................ H04L 65/605
 455/519
2007/0270172 A1 11/2007 Kalley et al.
2009/0093235 A1 4/2009 Grealish et al.
2011/0004636 A1 1/2011 Parkkinen et al.

OTHER PUBLICATIONS

Cisco Systems. Enable Communication Interoperability. http://www.cisco.com/en/US/products/ps6712/products_announcement0900aecd803498d8.html. Last accessed Jun. 3, 2008.

* cited by examiner

INTEROPERABILITY AND COMMUNICATIONS SYSTEM DYNAMIC MEDIA PROXY BASED ON CAPABILITY NEGOTIATION

BACKGROUND

Businesses around the world including public and private groups, such as security and safety personnel (e.g., police, fire fighters and ambulance drivers) use communication networks that employ differing technologies and/or standards for communication. Many networks utilize land mobile radios communicating through push-to-talk technologies. However, communications among different endpoints of different networks such as endpoints that employ differing technologies and/or standards may be difficult. Collaboration between the different agencies and networks tends to be ad hoc and inefficient and involves laborious manual intervention.

Interoperability systems can employ an Internet protocol (IP) network collaboration platform that brings two-way radios into the realm of IP networking, offering all the benefits of this widely embraced, standards-based technology and extending the reach of two-way radios to other voice, video and data networks. Interoperability systems employ standards-based IP technologies to join various non-compatible communications systems into one, cohesive infrastructure. The interoperability system expects certain behavioral conformance from the end points in the system to maintain a consistent end user experience, such as, but not limited to, audio quality, number of active talkers in a group, or talk group features (e.g. floor control, priority, pre-emption, etc.). Endpoints developed and controlled by the interoperability system software can adhere to the expected behavioral characteristics. However, endpoints based on platforms external to the interoperability system cannot automatically conform to the expected characteristics. Further, endpoints that are not complying with the interoperability system behavior cannot respect floor control of the system. Such endpoints can lose out on talk group features, such as, talker-id. Furthermore, endpoints based on non-interoperability platforms can potentially abuse the system through intentional and/or unintentional rogue behavior.

DESCRIPTION OF EXAMPLE EMBODIMENTS

Overview

Figure 1:
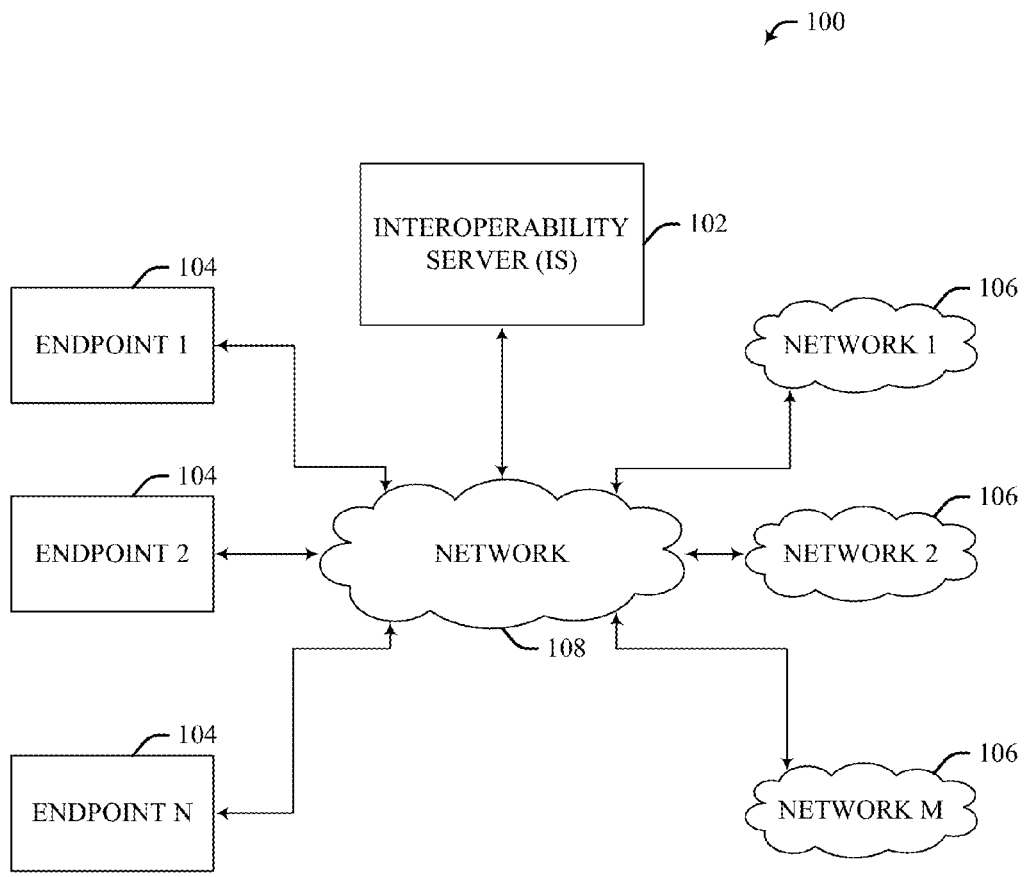
FIG. 1 illustrates a block diagram of an example system that can be employed to dynamically join various non-compatible communication systems into a cohesive infrastructure.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The system disclosed and claimed herein, in one embodiment thereof, can dynamically facilitate communication between two or more non-compatible communication devices. The system can dynamically decide to act as a media proxy for a particular communication device and deliver full featured media services to the device. The decision to connect a device via a proxy can be made dynamically based on the capabilities of the communication devices and available system resources.

According to another embodiment of the system, an endpoint that initiates communication can include an information determination component that can determine media capabilities of the endpoint and/or the identity of the endpoint. Furthermore, a negotiation component can advertise the determined information and negotiate a session with an interoperability server (IS) over a private channel. The endpoint can communicate with the IS through custom messaging.

In accordance with another embodiment of the specification, an IS can include an information collection component that can collect information associated with an endpoint that initiates communication. The information can include media capabilities of the endpoint and/or its identity and/or attributes. A resource determination component can determine information associated with available system resources, for example, bandwidth and/or memory. The IS can further include an analysis component that can analyze the information associated with the endpoint and the system resources to determine if the endpoint can be connected to a VTG via a proxy. The analysis component can identify an endpoint that does not adhere to specific rules of transmission and can dynamically connect such an endpoint to a VTG via a proxy to prevent the endpoint from transmitting media into an active VTG that already has multiple talkers streaming media. A dynamic proxy component can employ a proxy for the endpoint based on the analysis and dynamically establish a path for communication.

Another embodiment of the claimed subject matter relates to a system that can dynamically determine where media processing can be performed in an interoperability system. The determination can be based in part on the available system resources and/or the media capabilities of the endpoints that are joining a virtual talk group (VTG).

In accordance with yet another embodiment of the specification, the system can asses—a security risk associated with allowing a particular endpoint to join a VTG directly. If the identity of the endpoint cannot be validated as trusted and/or secure, the system can either reject the communication request or act as a proxy for the endpoint and join the VTG on behalf of the endpoint. Thus, the system can access control over potential rogue endpoints. The parameters of the VTG can be dynamically altered to conceal the VTG from an identified rogue endpoint, preventing the endpoint from streaming media into the VTG.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

The following terms are used throughout the description, the definitions of which are provided herein to assist in understanding various embodiments of the subject specification. The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

As used in this application, the terms "component" and "system" are intended to refer to an entity capable of processing information (e.g., computer-related entity), either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The system disclosed herein, relates to interoperability systems that can dynamically insert a media proxy based on capability negotiation, according to an embodiment of the invention. Conventional systems expect certain behavioral conformance from end points, such as but not limited to, RTCP (Real Time Transport Control Protocol) support, active stream selection, etc. and provide statically configured proxies to enable communication. Further, conventional systems cannot provide an access control over potential malicious endpoints.

The subject disclosure relates generally to communication networks and in particular to an interoperability system that facilitates a dynamic insertion of a media proxy based on capability negotiation. The subject specification provides a system and methodology that may support endpoints that are not compliant with an interoperability system behavior and can asses—the security risk is allowing endpoints to join a talk group. Further, the system can dynamically proxy such endpoints and optimize system resource utilization.

Referring initially to the drawings, FIG. 1 illustrates a system 100 that can be employed to dynamically join various non-compatible communication systems into one, cohesive infrastructure. As an example, the system 100 can allows users of two-way radios, often called push-to-talk radios, and other voice devices, such as cell phones and regular telephones, to directly communicate and collaborate. In one embodiment, the system 100 can include an interoperability server (IS) 102, endpoints 104 and communication networks 106 that can be connected through a network 108.

The IS 102 can facilitate communication between different non-compatible communication devices, such as endpoints 104. As an example, IS 102 can facilitate communications between a two-way radio and a mobile device. Though two-way radios offer an excellent way for mobile workers within a limited geographic area to communicate, most two-way radio systems cannot interact with any other communications system since they use non-compatible technologies. In another example embodiment, IS 102 can facilitate communication between users of UHF radios and VHF radios or amongst users who use different channels on the same frequency band (e.g., VHF). In other instances, radios signals cannot reach certain areas because of interference or physical barriers, cutting off radio users from the rest of the team or organization. IS 102 can connect two-way radios to other networks, for example, by employing IP (internet protocol) technology standards, and help extend their reach. Thus, IS 102 can bring non-compatible communication devices, such as, push-to-talk (PTT) radios, into a dynamic, real-time, and information-rich collaboration environment and can allow an entity to communicate with a PPT radio with another communication device.

According to an embodiment, IS 102 can employ a system approach to offer a framework based on IP services to provide and maintain a consistent end user experience and data interoperability among endpoints 104 of networks 106 that employ different technologies. IS 102 can allow endpoints 104 to participate in one or more communication sessions based on capability negotiation. The endpoints 104 can initiate a communication session and advertise its capabilities to the IS 102. The IS 102 can then determine if the endpoint 104 can be allowed to join a talk group based on the information collected about the endpoint 104. Furthermore, the IS 102 determines if the endpoint 104 can directly connect to the talk group or if it should be connected via a proxy. The IS 102 can dynamically proxy the endpoint 104 based on information regarding the endpoint 104 and information regarding resources of the system (e.g. bandwidth, memory) and/or specific transmission rules based on the number of active media streams in a virtual talk group.

Endpoints 104 can include, but are not limited to, non-compatible communication devices that can participate in a communication session, such as, PTT radios, IP phones, personal digital assistants (PDAs), personal computers, land mobile radios (LMR), and the like. A communication session can be an active communication between two or more endpoints 104, for example, a communication session can occur between endpoint 1 and endpoint N. The data communicated during the communication session can be most any format of data, such as, but not limited to, voice, text, audio, video, multimedia, control, other information or a combination thereof. It can be appreciated that although N endpoints are illustrated in the figure, namely, endpoint 1 to endpoint N (where N is a natural number from 1 to infinity), most any number of endpoints can be connected to network 108 and/or to networks 106. Endpoints 104 that are not compliant with the communication networks 106 can employ IS 102 to leverage features of the networks 106.

System 100 can include one or more communication networks 106. The networks 106 can include, but are not limited to, IP, non-IP, wireless or wired networks and can be distributed locally or across multiple geographic locations. As an example, networks 106 can include, a local area network (LAN), a wide area network (WAN), a metropolitan area network (MAN), a cellular network, a public switched telephone network (PSTN), a public or private network, a land mobile radios (LMR) network, a satellite network, an internet network or any combination thereof.

Figure 2:
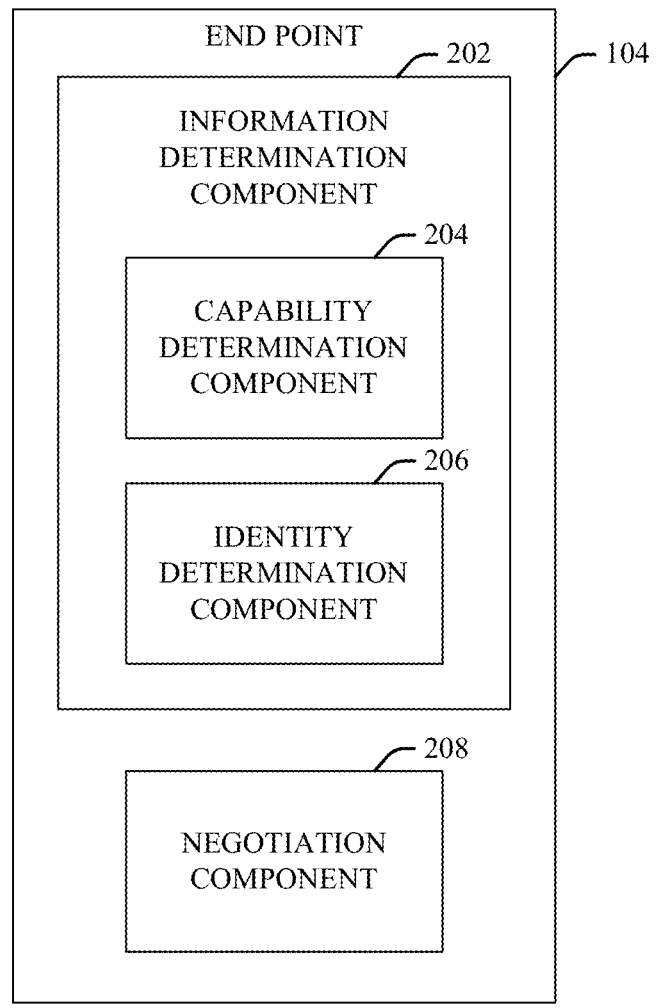
FIG. 2 illustrates an example endpoint that initiates a communication session according to an embodiment of the subject specification.

Referring now to FIG. 2, there is illustrated an example endpoint 104 in accordance with an embodiment of the specification. As discussed supra, the endpoint 104 can be a non-compatible communication device, such as, but not limited to, a telephone, a cellular phone, an IP phone, a PDA, a fax machine, a PC, a camera, a camcorder, an LMR, a software radio, such as, Push-to-Talk Management Center (PMC) or the like. According to an embodiment of the subject specification, the endpoint 104 can include an information determination component 202 that can be employed to determine information related to the endpoint 104.

In one embodiment, the information determination component 202 can include a capability determination component 204 and/or an identity determination component 206. The capability determination component 204 can determine media capabilities associated with the endpoint 104, such as, but not limited to, the supported control protocol(s) or the number of incoming streams per talk group or channel supported by the endpoint 104. Further, the identity determination component 206 can determine an identity associated with the endpoint 104, such as a talker-id, or IP address. In another example embodiment, the identity of the endpoint can provide the name of the manufacturer and can indicate the capabilities of the said endpoint.

The endpoint 104 can further include a negotiation component 208 that can be employed to negotiate capabilities of the endpoint 104 with an IS 102 (FIG. 1). The negotiation component 208 can advertise media capabilities and/or the identity associated with the endpoint 104 as determined by the information determination component 202. More specifically, the negotiation component 208 can determine if the endpoint 104 has initiated a communication and would like to participate in a virtual talk group (VTG). The negotiation component 208 can negotiate a session with an IS 102 (FIG. 1) over a private unicast and/or multicast channel. Further, the negotiation component 208 can present determined and/or identified capabilities and/or identity associated with the endpoint 104. Based on the information provided by the negotiation component 208, the IS 102 (FIG. 1) can determine if the endpoint 104 should be allowed to join the VTG and also determine if the endpoint should be directly connected to the VTG or should be connected via a proxy based in part on the system's 100 (FIG. 1) floor control policy. Furthermore, the IS 102 (FIG. 1) can determine if the endpoint 104 adheres to the rules of transmission. If the endpoint 104 does not adhere to rules of transmission, it can be dynamically connected to the VTG via a proxy to prevent transmitting media into an active VTG that already has multiple talkers streaming media into it, and thus rendering the VTG useless. In an example embodiment, if the endpoint 104 is admitted into a VTG without proper credentials, it can be continuously monitored by other endpoints for its adherence with system's floor control policy. If another endpoint identifies the monitored endpoint as non-conforming with the floor control policy of the system, the IS 102 (FIG. 1) can dynamically insert a proxy between the endpoint 104 and the VTG. In addition, the parameters of the VTG can be dynamically altered to conceal the VTG from the identified endpoint and prevent it from streaming into the VTG.

As an example, the endpoint 104 can be an IP phone in accordance with an embodiment of the specification. The IP phone can initiate a communication with another endpoint, such as a cellular phone that is part of a VTG. The information determination component 202 can identify the capabilities associated with the IP phone, such as, built in media termination, multicast stack support, Extensible Markup Language (XML) services. Further, the information determination component 202 can determine that the IP phone does not support RCTP. The negotiation component 208 can negotiate a session with the IS (FIG. 1) over a private unicast/multicast channel and can present the identity and capability of the IP phone to the IS FIG. 1) over the private channel employing custom messages. The IS (FIG. 1) can then proxy for the IP phone since the IP phone does not support RTCP. The IP phone can transfer traffic over the private channel to the IS (FIG. 1), which can stream the traffic to the VTP and vice versa. Alternately or in addition, the information determination component 202 can determine that the IP phone does not adhere to the limit of a specified number of multicast streams per VTG and the IS FIG. 1) can connect the IP phone to the VTG via a proxy. Since the proxy is a trusted component, the proxy can refrain from streaming media into a VTG which already has a maximum number of active media streams as specified by the specific rules of transmission.

Figure 3:
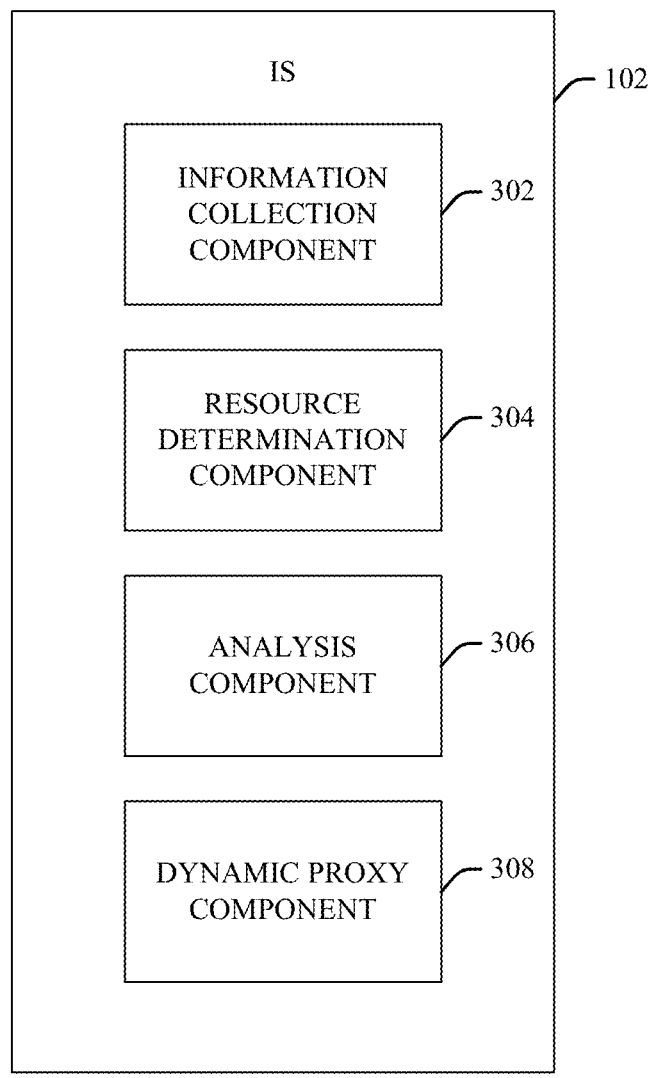
FIG. 3 illustrates an example interoperability system that can dynamically facilitate communication between non-compatible communication devices in accordance with embodiment of the specification.

FIG. 3 illustrates an example IS 102 in accordance with embodiment of the specification. The IS 102 can be employed to facilitate communication between different non-compatible communication devices. Additionally, the IS 102 can be employed to assess security risks associated with a particular endpoint and also be employed to optimize system resources during communication sessions.

In an embodiment, the IS 102 can include an information collection component 302 that can determine information regarding an endpoint that has initiated a communication session. The information collection component 302 can collect information from the endpoint through custom messages over a private channel. The information can include, but is not limited to, media capabilities of the endpoint, the identity of the endpoint and/or attributes of the endpoint.

The IS 102 can further include a resource determination component 304 that can determine available system resources, e.g. bandwidth, and/or memory. The system resource information can be employed to optimize resource utilization, for example, by load sharing. The resource determination component 304 can dynamically update the system resource information, such that the IS 102 has up-to-date information regarding the availability of system resources. The information regarding the available system resources can be employed to negotiate the dynamic utilization of a proxy for a particular endpoint and establish a communication path based on the resource information and/or the capability information.

The information collected by the information collection component 302 and the information determined by resource determination component 304 can be analyzed by an analysis component 306. The analysis component 306 can determine if the endpoint can provide the quality of service required in the VTG based on the analysis of the capabilities of the endpoint. In one embodiment, the analysis component 306 can detect an endpoint which may not adhere to the rules of transmission based on collected information. In one embodiment, the analysis component 306 can analyze the information to decide if the requesting endpoint can be allowed to join the VTG and further determine if the endpoint can join the VTG directly.

The analysis component 306 can validate the endpoint identity as secured and/or trusted and determine if the requesting endpoint is a trusted endpoint or potentially a rouge endpoint. It can be appreciated that the analysis component 306 can also identify a malicious endpoint by validating the endpoint identity as malicious. If the requesting endpoint is identified as malicious, the analysis component 306 can reject the request for communication from the endpoint. Further, the analysis component 306 can determine if a non malicious endpoint can join a VTG directly.

The analysis component 306 can analyze the capabilities of the endpoint (determined by the information collecting component 302) to determine if the endpoint should be connected via a proxy. If the capabilities are analyzed to be non-conforming to the IS 102, a dynamic proxy component 308 is employed to proxy the endpoint. It can be appreciated that the dynamic proxy component 308 and the IS 102 can reside on the same or on different servers. Logically, the IS 102 can facilitate the creation and maintenance of the VTG as it is responsible for the control signals and the dynamic proxy component 308 can deal with a media component (not shown). Thus, although the dynamic proxy component 308 is depicted as a part of the IS 102, it can be appreciated that the dynamic proxy component can reside on a separate server. In one embodiment, the IS 102 can be attached to network 106 (or 108) while the dynamic proxy may be attached to another network 108 (or 106).

If the analyzed capabilities conform to the IS, the endpoint can be allowed to directly join the VTG. As an example, if the analysis component 306 determines that the requesting endpoint does not support RTCP, the IS 102 can proxy the endpoint. In an embodiment, if the analyzed capabilities cannot confirm that the endpoint would prevent media streaming into a multicast address, which already has a maximum number of active media streams, the IS 102 can connect the endpoint via a dynamic proxy. Furthermore, the analysis component 306 dynamically determines if a proxy can be utilized based on the system resource information provided by the resource determination component 304. The analysis component 306 can additionally employ machine learning to facilitate automating one or more features in accordance with the subject specification.

The subject specification (e.g., in connection with validation of an endpoint to join a VTG) can employ various AI-based schemes for carrying out various embodiments thereof. For example, a process for determining if an endpoint can directly join a VTG can be facilitated via an automatic classifier system and process. Moreover, where the endpoint requests to join a particular VTG, the classifier can be employed to determine if the endpoint can be allowed to join the VTG and/or the endpoint can be allowed to join the VTG directly.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of interoperability systems, for example, attributes can be capabilities and/or identity of the endpoint or other data-specific attributes derived from the capabilities and/or identity, and the classes can be categories or areas of interest. In one example embodiment, the classification is made base on the sub-network to which the endpoint is attached.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria. Referring back to FIG. 3, the IS 102 can include a dynamic proxy component 308 that can be dynamically employed to proxy the endpoint based on the analysis performed by the analysis component 306. The dynamic proxy component 308 can communicate with the endpoint through a private session and join the VTG on behalf of the endpoint. Thus, the dynamic proxy component 308 can establish a communication path based on capability negotiation. The dynamic proxy component 308 can behave as a fully-compliant endpoint and relay relevant information and/or features to the endpoint for which it serves as a proxy through custom messaging. Additionally, the dynamic proxy component 308 can provide talk group features, such as, but not limited to, floor control, talker-id, priority and/or pre-emption on behalf of the endpoint. In one embodiment, if the endpoint is admitted into a VTG without proper credentials, it can be continuously monitored by other endpoints for its adherence with system's floor control policy. If another endpoint identifies that the monitored endpoint as non-conforming with the floor control policy of the system, the dynamic proxy component 308 can dynamically insert a proxy between the endpoint 104 and the VTG.

As an example, if an IP phone initiated a connection to a specific VTG, the information collection component 302 can collect information regarding the IP phone and determine that the IP phone cannot offer full featured RTCP support, talker-id, priority or pre-emption features. The analysis component 306 can determine that the IP phone should be connected to the VTG via a proxy based in part on the information associated with system resources. The dynamic proxy component 308 can then join the intended VTG on behalf of the IP phone. The audio traffic from the IP phone can be received by the dynamic proxy component 308 over a private channel and can be streamed to the intended VTG and vice versa. The dynamic proxy component 308 can preempt the IP phone and prevent the media stream from the IP phone to be streamed into the VTG based on an analysis by the IS 102.

Figure 4:
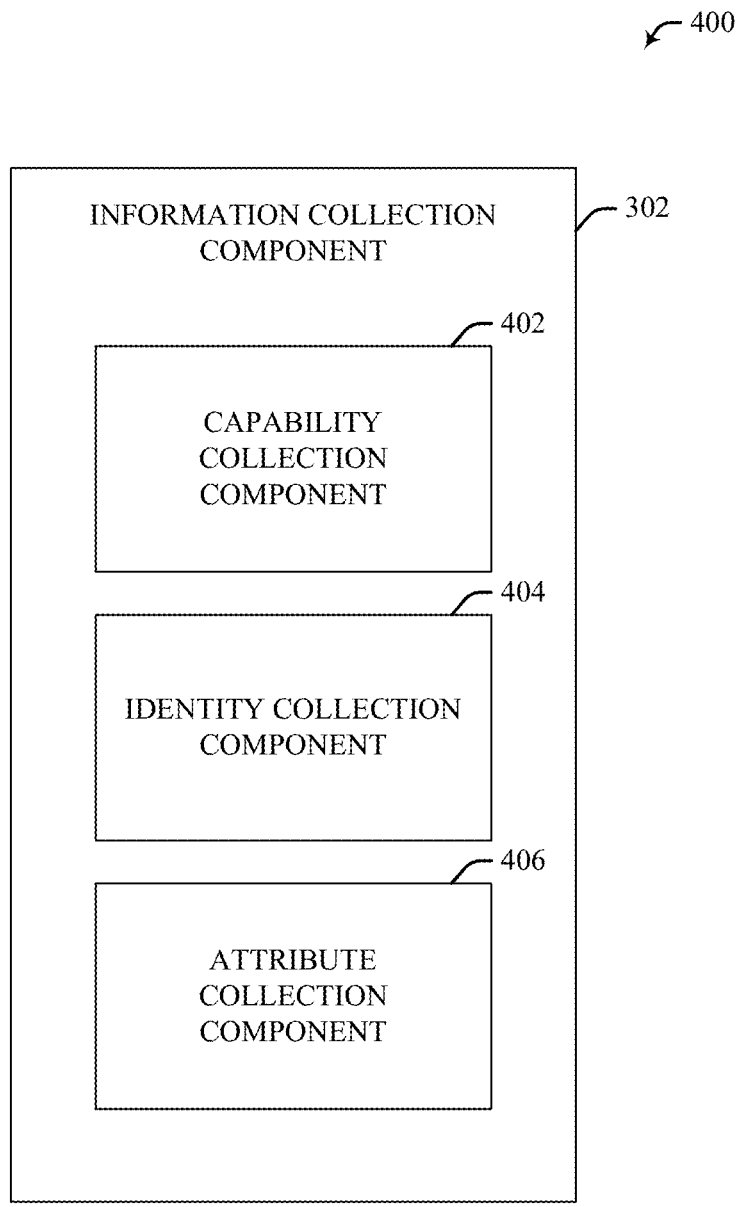
FIG. 4 illustrates an example system that facilitates collection of information associated with an endpoint that initiates a communication session according to an embodiment of the subject specification.

Referring now to FIG. 4, there is illustrated an example system 400 that facilitates collection of information associated with an endpoint that initiates a communication session. The example information collection component 302 depicted in the system can be employed to gather, identify and/or determine information advertised by an endpoint. The information collection component 302 can generally include a capability collection component 402 that can be employed to determine information regarding media capabilities of a requesting endpoint. The media capabilities can include behavioral characteristics, such as, but are not limited to, RTCP support, the ability to detect that other members of the VTG are speaking and consequently not streaming media into the said VTG, active stream selection, and/or talk group features. The system 400 can dynamically employ a proxy for the endpoint if the capabilities of the said endpoint are determined to be non-conforming to IS standards.

The information collection component 302 can also include an identity collection component 404 that can be employed to determine the identity of the requesting endpoint. The identity of the endpoint can be employed to validate the security of the endpoint. Further, an attribute collection component 406 can collect attributes associated with the endpoint from the packets sent by the endpoint. If the identity of the endpoint is not determined, the information from the attributes can be utilized to verify the security of the endpoint. As an example, the attribute can include security credentials of the endpoint.

Figure 5:
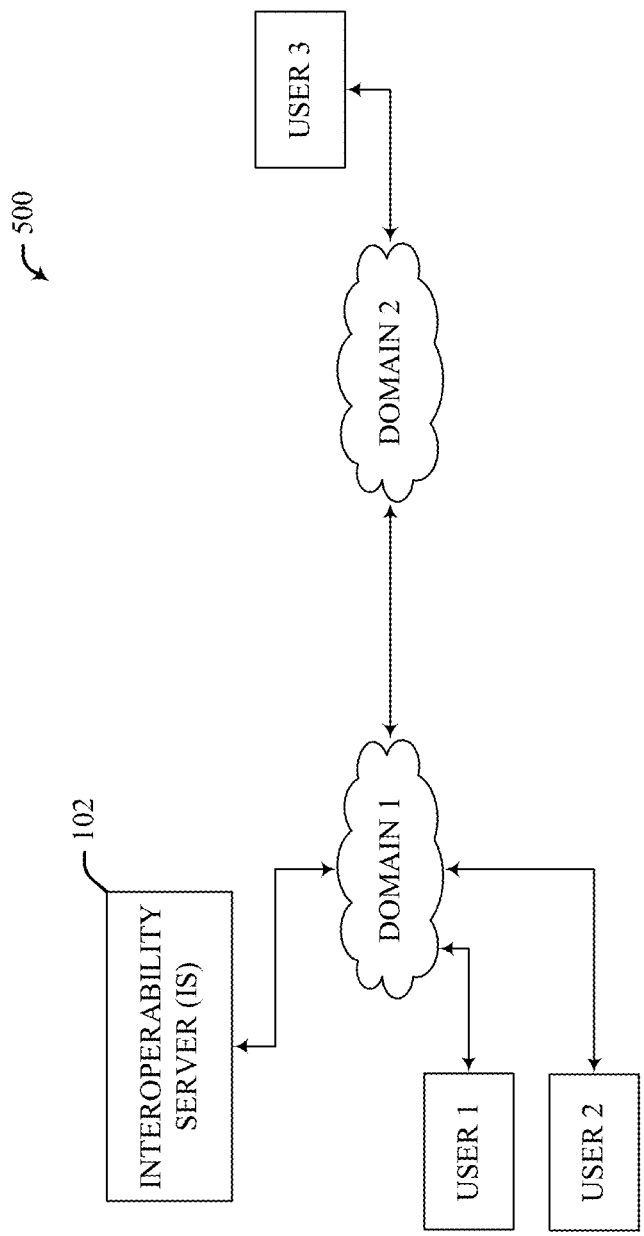
FIG. 5 illustrates an example interoperability system that can dynamically determine where media processing can be performed in accordance with an embodiment of the specification.

FIG. 5 illustrates an example system 500 that can dynamically determine where media processing can be performed in an interoperability system. The system 500 can include an IS 102 that can facilitate communication between communication devices that employ non-compatible technologies for communication. For example, user 1 and user 2 can employ two-way radios while user 3 can employ a handheld device, such as a cellular phone. It can be appreciated that user 1, user 2 and user 3 can employ most any communication device including, but not limited to, a telephone, a mobile phone, a PMC, an IP phone, a PDA, a fax machine, a PC, a camera, a video camera, a LMR or a combination thereof. Furthermore, it can be appreciated that although only three users are illustrated in the figure, two or more users can employ the disclosed system.

As an example, a scenario wherein user 3 from domain 2 wants to communicate with two users from domain 1 (user 1 and user 2) can be described with respect to FIG. 5. The user 3 can initiate communication through a hand held device, such as an IP phone. The users in domain 1 employ different standards for communication as the user in domain 2. When a user joins a VTG, the location and resources on an endpoint employed by the user are considered. During communication, user 1 and user 2 from domain 1 can stream media from domain 1 to domain 2. This can be achieved in two ways, namely, transfer the two media streams from domain 1 to domain 2 & mix them in the endpoint (e.g. IP phone) or utilize a proxy in domain 1 that can process the media streams in domain 1 and transfer a single media stream to domain 2. The IS 102 can determine the location where media processing can occur, for example, by an analysis component 306 (FIG. 3). The IS 102 determines the available system resources (e.g. by a resource determination component shown in FIG. 3) and capabilities of the devices employed by the users (e.g. by an information collection component shown in FIG. 3) to determine an optimal location for media processing. For example, if current available bandwidth is low, the IS 102 can utilize a proxy to process the media streams from user 1 and user 2 in domain 1 and transfer a single media stream to user 3 in domain 2. Furthermore, the dynamic proxy component 308 (FIG. 3), in the IS 102, can monitor the IP multicast address/port and determine if there are other active media streams on the multicast address. If the analysis component 306 (FIG. 3), in the IS 102, detects more than a maximum specified number of active media steams on the multicast address, the dynamic proxy component 308 (FIG. 3) can back up and refrain from transmitting media to the multicast address. If user 3 does not adhere to the specified transmission rule, it can transmit media into an already busy VTG. The analysis component 306(FIG. 3) can check if user 3 has the capability to adhere to the specified rule. If the IS 102 cannot ensure that the user 3 would adhere to the said rule, the IS 102 can connect the user 3 to the VTG via a proxy. Since the proxy is a trusted component, it would refrain from streaming media into an active VTG which already has a maximum number of active media streams.

Figure 6:
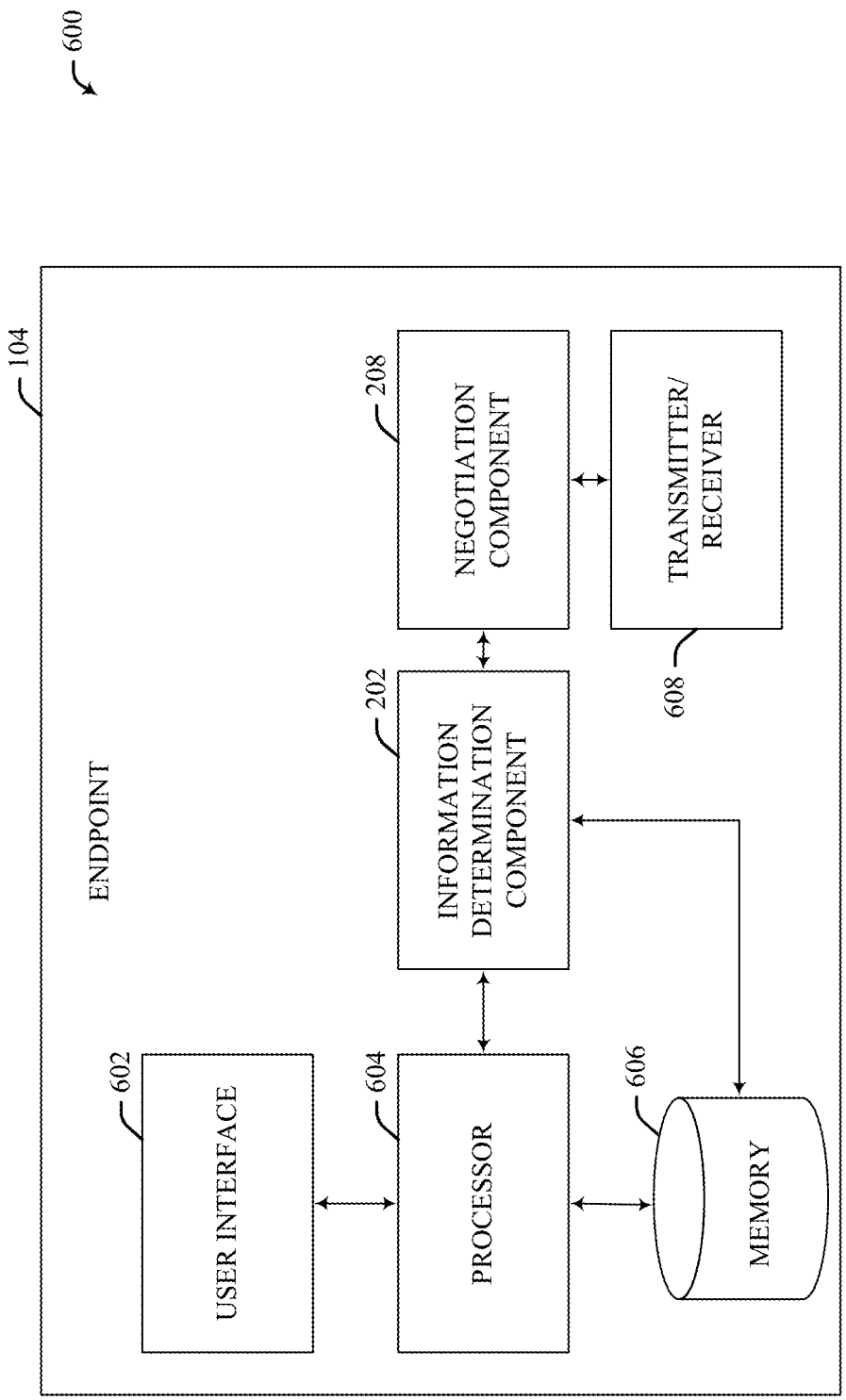
FIG. 6 illustrates an example system that can be employed to communicate with an interoperability system according to an embodiment of the specification.

Referring now to FIG. 6, there is illustrated an example system 600 that can be employed to communicate with an interoperability system. In an embodiment, the system 600 can include most any device or system, such as, endpoint 104 that can be employed for communication. The endpoint 104 can support half duplex and/or full duplex communication.

The endpoint 104 can generally include a user interface 602 that can be employed by an entity, such as a user to initiate or receive communication. The user interface can include a speaker, a microphone, a visual display, a keypad or a combination thereof. The keypad may include HW buttons and/or menu driven soft buttons. The endpoint 104 can further include a processor 604 that can perform operations within the endpoint 104 and a memory 606 that can store information within the endpoint 104. Furthermore, the endpoint 104 can include an information determination component 202 that can be employed to identify information associated with the endpoint 104, such as capability information and/or identity information. A negotiation component 208 can be employed to exchange capability information with an interoperability server (not shown) during communication. It is to be appreciated that information determination component 202 and negotiation component 208 can be the same or similar as, and/or can contain the same or similar functionality as illustrated in FIG. 2 and other figures and described herein.

A transmitter/receiver 608 can be employed to transmit and receive data from/to the endpoint 104. It can be appreciated that the transmitter and receiver can be separate modules or integrated as a single module. The transmitter/receiver 608 can transmit information determined by the information collection component 202 to an interoperability server (not shown) over a private channel to initiate communication. The transmitter/receiver 608 can employ wireless and/or wired communication to transmit/receive information.

Figure 7:
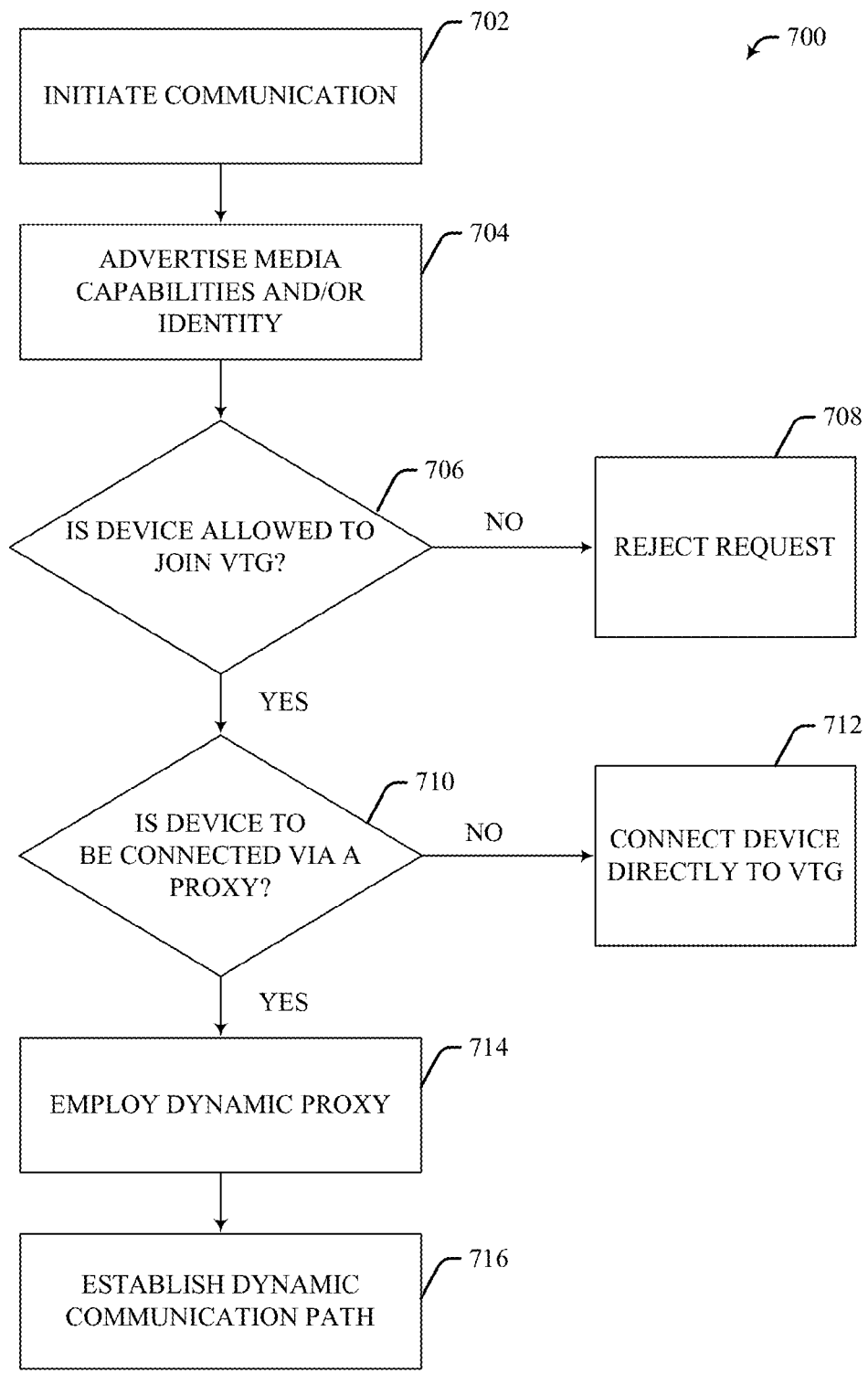
FIG. 7 illustrates an example flow chart of procedures that dynamically facilitate communication between non-compatible communication devices in accordance with embodiment of the specification.

FIG. 7 illustrates an example methodology 700 that can facilitate dynamic communication between non-compatible communication devices in accordance with embodiment of the specification. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification.

Referring back to FIG. 7, a communication between devices can be initiated at 702. The devices can employ non-compatible technologies and/or standards for communication. At 704, media capabilities and/or identity of the device that initiated communication can be advertised. At 706, a decision can be made if the device is allowed to join a VTG based on its identity. If the device identity is determined to be untrusted or malicious the device cannot be allowed to join the VTG and the request can be rejected at 708. If the device identity is determined to be trusted or safe, it can be determined if the device should join via proxy, as shown at 710. The determination at 710 can be based on the media capabilities of the device and the available system resources. If it is determined that the device does not need to join via proxy since the device can adhere to the behavioral characteristics of an interoperability system, such as but not limited to, transmission rules, the device can be directly connected to the VTG, as shown at 712. However, if the device demonstrates that it cannot comply with the behavioral characteristics of the interoperability system, the device can be attached to a VTG via a proxy. In one embodiment, if it cannot be determined that the endpoint can adhere to specified rules of transmission, the endpoint can be connected to the VTG via a proxy. At 714, a dynamic proxy can be employed for attaching the endpoint device to the VTG. In one embodiment, if the endpoint is admitted into a VTG without proper credentials, it can be monitored for its adherence with a floor control policy, such as a specified rule of transmission. If it is identified that the monitored endpoint is non-conforming with the floor control policy, a proxy can dynamically be inserted between the endpoint and the VTG.

At 716, a dynamic path can be established for communication from the endpoint device to the dynamic proxy and the proxy to the intended device in the VTG. The dynamic path can be based on the available system resources, such as, but not limited to, memory and/or bandwidth.

Figure 8:
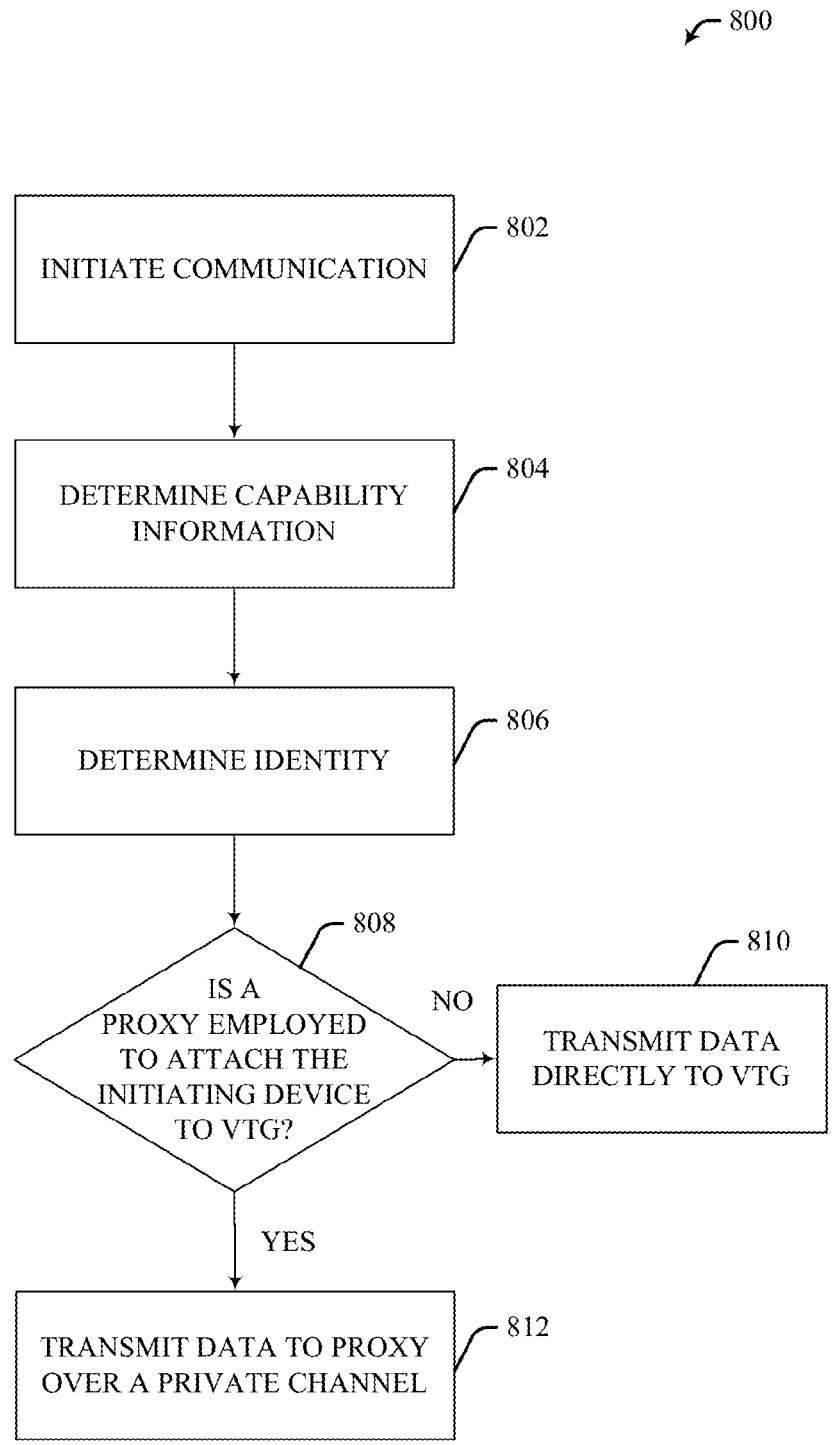
FIG. 8 illustrates an example flow chart of procedures for dynamically communicating with a device in an interoperability communication system via a dynamic media proxy in accordance with the specification.

Referring now to FIG. 8, there is illustrated an example methodology 800 of communicating with a device in an interoperability communication system via a dynamic media proxy in accordance with the specification. At 802, communication with a non-compatible communication device(s) can be initiated. At 804, media capability information associated with the initiating device can be determined. At 806, an identity of the initiating device can be determined. At 808, it can be determined if a proxy is employed to attach the initiating device to the given VTG. If a proxy is not employed to attach the endpoint device to the given VTG, media can be transmitted directly to a VTG at 810. Thus, the initiating device can directly communicate with an indented device in the VTG. If it is determined that the proxy is employed to attach the endpoint device to the given VTG, media can be transmitted to the proxy over a private network through custom messages at 812.

Figure 9:
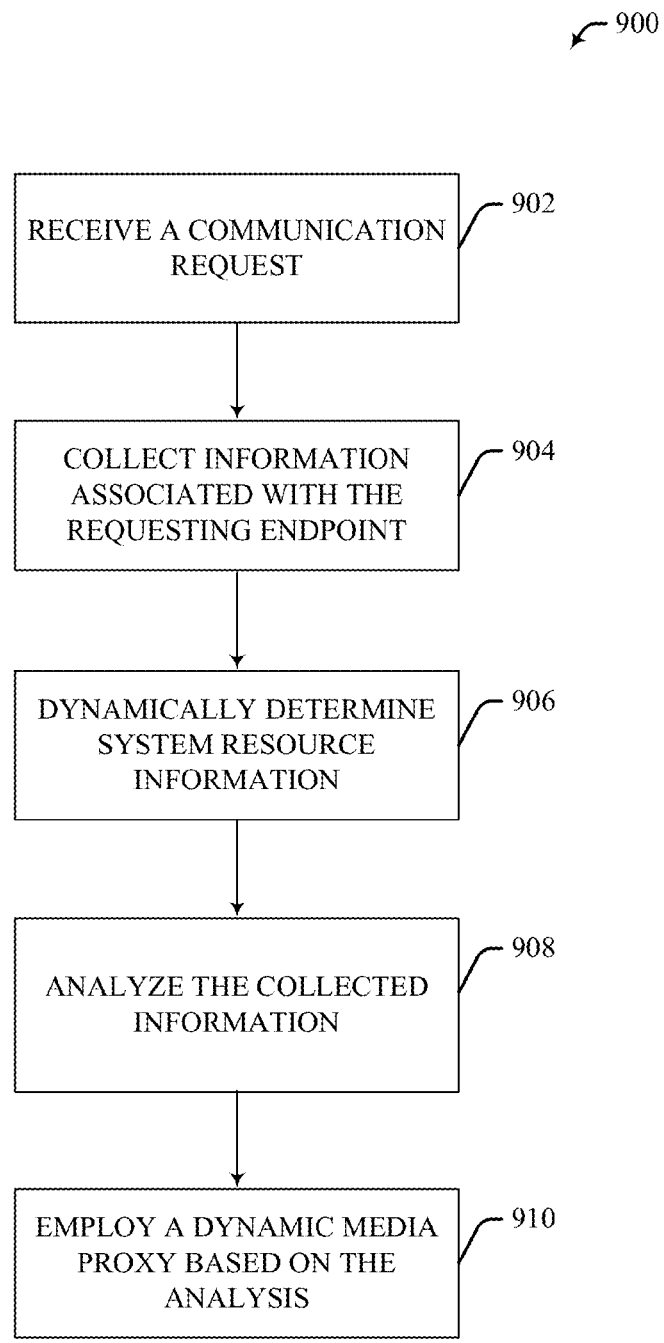
FIG. 9 illustrates an example flow chart of procedures that facilitate utilization of a dynamic media proxy, according to an embodiment of the subject specification.

FIG. 9 illustrates an example methodology of utilizing a dynamic media proxy in accordance with the specification. At 902, a communication request can be received. The request can be from most any endpoint (e.g. PTT radio) to initiate communication with another endpoint (e.g. cellular phone). At 904, information associated with the requesting endpoint can be dynamically determined. The information can include, but is not limited to, media capabilities, device identity attributes associated with the device and/or the device's capability to adhere to a specified transmission rule. At 906, system resource information, such as, but not limited to, bandwidth, memory and/or number of active media streams can be collected. At 908, the collected information can be analyzed. At 910 a dynamic media proxy can be utilized to facilitate communication between non-compatible communication devices based on the collected information. In one embodiment, the VTG can be monitored for number of active media streams and media transmission between the endpoint can be established via a proxy if a maximum number of active media streams are detected and it is determined that the endpoints do not adhere to the transmission rule.

Figure 10:
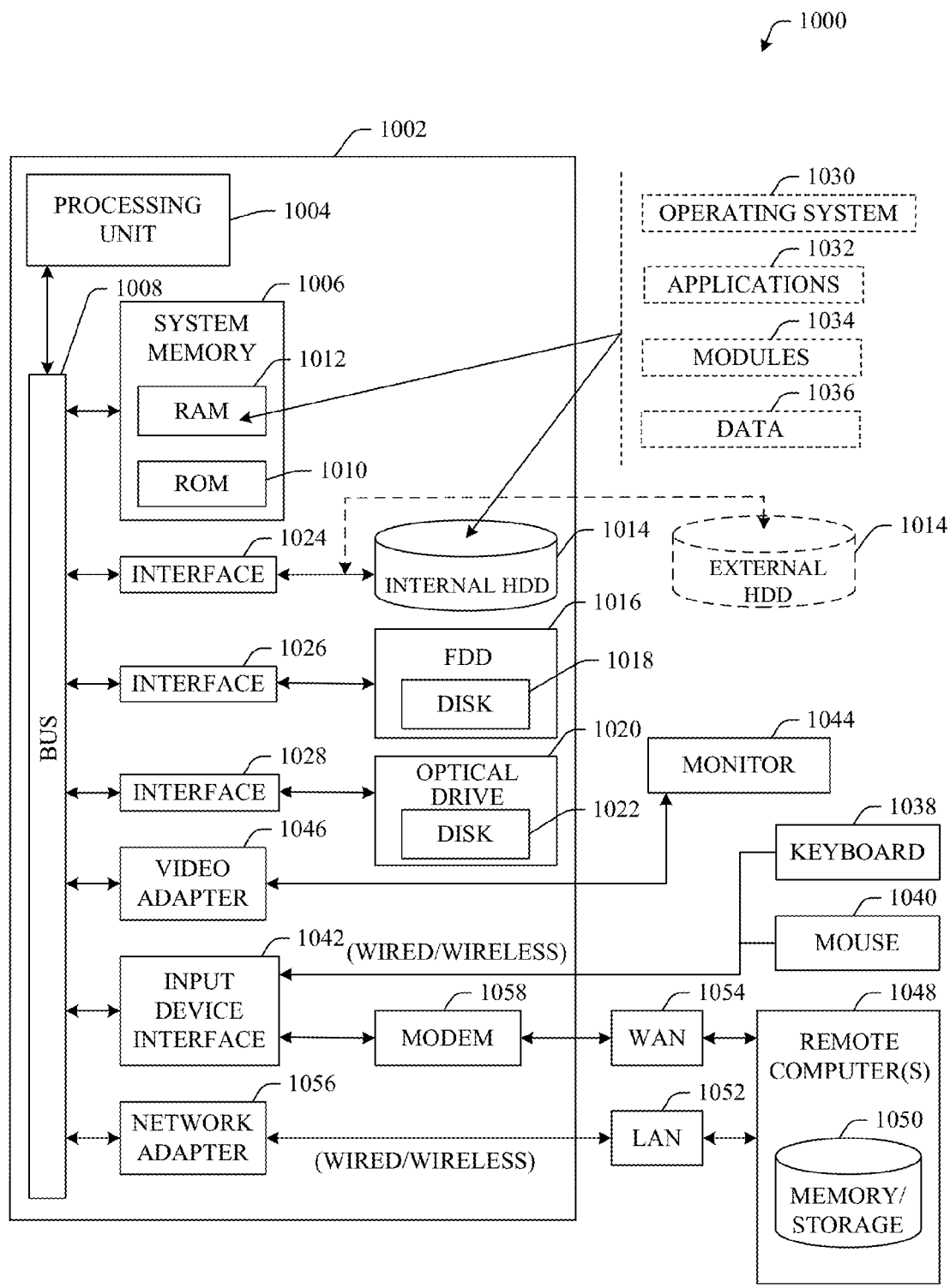
FIG. 10 illustrates a block diagram of a computer operable to execute the disclosed architecture.

Referring now to FIG. 10, there is illustrated a block diagram of a computer operable to execute the disclosed architecture that can be employed to join various non-compatible communications systems into a cohesive infrastructure by employing a dynamic media proxy based on capability negotiation. In order to provide additional context for various embodiments of the subject specification, FIG. 10 and the following discussion are intended to provide a brief, general description of a suitable computing environment 1000 in which the various embodiments of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the specification may also be practiced in distributed computing environments where certain tasks are performed by remote processing devices that are linked through a communications network. In a distributed computing environment, program modules can be located in both local and remote memory storage devices.

A computer includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various embodiments of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004. In some embodiments, the processor unit 1004 can include a digital signal processor (DSP).

The system bus 1008 can be any of several types of bus structure that may further interconnect to a memory bus (with or without a memory controller), a peripheral bus, and a local bus using any of a variety of commercially available bus architectures. In some embodiments, the bus can be a fast network resulting in a distributed components attached to the network. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, endpoint device, portable computer, microprocessor-based entertainment appliance, a peer device or other common network node, and includes many or all of the elements described relative to the computer 1002, although, for purposes of brevity, only a memory/storage device 1050 is illustrated. The logical connections depicted include wired/ wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
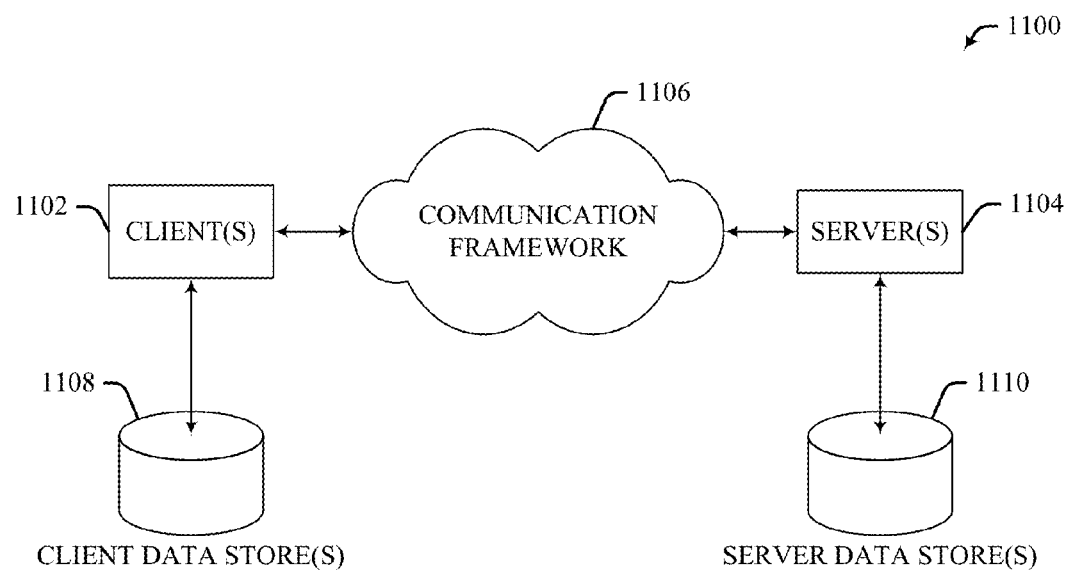
FIG. 11 illustrates a schematic block diagram of an exemplary computing environment in accordance with the subject specification.

Referring now to FIG. 11, there is illustrated a schematic block diagram of an exemplary computing environment 1100 that can facilitate communication between non-compatible communication devices in accordance with embodiment of the specification. The system 1100 includes one or more client(s) 1102. The client(s) 1102 can be hardware and/or software (e.g., threads, processes, computing devices). The client(s) 1102 can house cookie(s) and/or associated contextual information by employing the subject specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus comprising a processor, wherein the processor is configured to:
    identify information related to an endpoint to obtain identified information; and
    negotiate a communication session with an interoperability server (IS) based in part on at least one of the identified information or a predefined floor control mechanism associated with the IS; and
    receive a first determination from the IS that the endpoint is not in adherence with capabilities of the predefined floor control mechanism and that a proxy is to be dynamically inserted to connect the endpoint to a virtual talk group, wherein the capabilities comprise quality of service, rules of transmission and trusted endpoint identity.

2. The apparatus of claim 1, wherein the processor is further configured to identify media capabilities associated with the endpoint, the media capabilities employed by the IS to dynamically determine if the endpoint should be connected to the virtual talk group via the proxy.

3. The apparatus of claim 2, further comprising a transmitter, wherein the transmitter transmits data to the virtual talk group if it is determined that the proxy is not employed to connect the endpoint to the virtual talk group.

4. The apparatus of claim 2, further comprising a transmitter, wherein the transmitter transmits data to the proxy over a private channel if it is determined that the proxy is employed to connect the endpoint to the virtual talk group.

5. The apparatus of claim 1, wherein the processor is further configured to determine an identity associated with the endpoint, the identity employed by the IS to dynamically determine if the endpoint should be connected to the virtual talk group via the proxy.

6. The apparatus of claim 1, wherein the processor is configured to:
receive a second determination from the IS to connect the endpoint directly to the virtual talk group without the proxy when the endpoint is conforming with the capabilities, and
connect the endpoint to the virtual talk group in response to receiving one of the first determination or the second determination.

7. The apparatus of claim 1, wherein the processor is further configured to monitor endpoints directly connected to the virtual talk group and determines that a directly connected endpoint is not conforming with a floor control policy of the virtual talk group.

8. A method comprising:
initiating communication with a non-compatible communication device;
identifying information associated with an initiating device; and
negotiating a communication session with an interoperability server (IS) based in part on at least one of the identified information or a predefined floor control mechanism associated with the IS; and
receiving a first determination from the IS that the initiating device is not in adherence with capabilities of the predefined floor control mechanism and that a proxy is to be dynamically inserted to connect the initiating device to a virtual talk group, wherein the capabilities comprise quality of service, rules of transmission and trusted endpoint identity.

9. The method of claim 8, wherein the information associated with the initiating device includes at least one of media capability information associated with the initiating device or an identity of the initiating device.

10. The method of claim 8, further comprising transmitting media to the proxy over a private network through custom messages if it is evaluated that the proxy is employed.

11. The method of claim 8, further comprising, attaching the initiating device directly to the virtual talk group and transmitting media directly to the virtual talk group if the proxy is not employed to attach the initiating device to the virtual talk group.

12. An endpoint comprising:
a transmitter and a receiver;
a user interface;
a processor coupled to the user interface, wherein the processor:
identifies information related to the endpoint; and
negotiates a communication session with an interoperability server based in part on at least one of the identified information or a predefined floor control mechanism associated with the interoperability server; and
receive a first determination from the interoperability server that the endpoint is not in adherence with capabilities of the predefined floor control mechanism and that a proxy is to be dynamically inserted to connect the endpoint to a virtual talk group, wherein the capabilities comprise quality of service, rules of transmission and trusted endpoint identity.

13. The endpoint of claim 12, wherein the processor identifies media capabilities associated with the endpoint, the media capabilities employed by the interoperability server to dynamically determine if the endpoint should be connected to the virtual talk group via the proxy.

14. The endpoint of claim 12, wherein the processor determines an identity associated with the endpoint, the identity employed by the interoperability server to dynamically determine if the endpoint should be connected to a virtual talk group via the proxy.

15. The endpoint of claim 12, wherein the processor causes the transmitter to transmit data to the virtual talk group if it is determined that the proxy is not employed to connect the endpoint to the virtual talk group.

16. The endpoint of claim 12, wherein the processor causes the transmitter to transmit data to the proxy over a private channel if it is determined that the proxy is employed to connect the endpoint to the virtual talk group.

17. A non-transitory computer readable storage media comprising instructions that, when executed by a processor, cause the processor to perform operations comprising:
initiating communication with a non-compatible communication device;
identifying information associated with an initiating device; and
negotiating a communication session with an interoperability server based in part on at least one of the identified information or a predefined floor control mechanism associated with the interoperability server; and
receiving a first determination from the IS that the initiating device is not in adherence with capabilities of the predefined floor control mechanism and that a proxy is to be dynamically inserted to connect the initiating device to a virtual talk group, wherein the capabilities comprise quality of service, rules of transmission and trusted endpoint identity.

18. The non-transitory computer readable storage media of claim 17, wherein the information associated with the initiating device includes at least one of media capability information associated with the initiating device or an identity of the initiating device.

19. The non-transitory computer readable storage media of claim 18, further comprising instructions operable to cause the processor to transmit media to the proxy over a private network through messages if it is evaluated that the proxy is employed.

20. The non-transitory computer readable storage media of claim 18, further comprising instructions operable to cause the processor to connect the initiating device directly to the virtual talk group and to transmit media directly to the virtual talk group if the proxy is not employed to attach the initiating device to the virtual talk group.

* * * * *